United States Patent [19]
Branton, Jr. et al.

[11] Patent Number: 5,870,558
[45] Date of Patent: Feb. 9, 1999

[54] INTRANET GRAPHICAL USER INTERFACE FOR SONET NETWORK MANAGEMENT

[75] Inventors: Robert A. Branton, Jr., Farmers Branch; John Mark DeMoss, The Colony; Sam Stepler, Plano; Eric V. Kouch, Richardson; Arthur Lee Parks, Jr., Irving; Steve Landon, Dallas, all of Tex.

[73] Assignee: MCIWorldcom, Inc., Ga.

[21] Appl. No.: 778,731

[22] Filed: Dec. 31, 1996

Related U.S. Application Data

[63] Continuation-in-part of Ser. No. 671,029, Jun. 25, 1996, Pat. No. 5,845,062.

[51] Int. Cl.⁶ .................................................. G06F 15/16
[52] U.S. Cl. ............................. 395/200.54; 395/200.47; 395/200.33; 395/200.51
[58] Field of Search ................. 395/200.54, 200.53, 395/200.47, 200.33, 200.5, 200.51

[56] References Cited

U.S. PATENT DOCUMENTS

| | | | |
|---|---|---|---|
| 5,210,530 | 5/1993 | Kammerer et al. ............... | 340/825.08 |
| 5,226,120 | 7/1993 | Brown et al. ........................ | 395/200 |
| 5,285,494 | 2/1994 | Sprecher et al. .................... | 379/59 |
| 5,309,509 | 5/1994 | Cocklin et al. ..................... | 379/165 |
| 5,513,171 | 4/1996 | Ludwiczak et al. ................. | 370/13 |
| 5,586,121 | 12/1996 | Moura et al. ...................... | 370/404 |
| 5,630,061 | 5/1997 | Richter et al. .................... | 395/200.02 |
| 5,734,831 | 3/1998 | Sanders ............................ | 395/200.53 |
| 5,742,762 | 4/1998 | Scholl et al. ..................... | 395/200.3 |

Primary Examiner—Mehmet B. Geckil

[57] ABSTRACT

A system and method for effectively retrieving and managing network data from thousands of network elements by providing a graphical user interface to a network management system that permits shared access by service provider personnel using diverse computer equipment distributed over a wide geographical region. User requests to the network management system are input via any one of a plurality of workstations that are coupled with a company-wide Intranet system. Additionally, users can view pre-defined performance reports via a web browser program running on any one of the plurality of workstations coupled with the company-wide Intranet. Users can submit batch or on-line requests. Batch requests are scheduled to be processed at a later time and on-line requests are processed immediately. Results from on-line requests are available to the user as soon as the request has been processed.

24 Claims, 12 Drawing Sheets

Controller Process

Merge Data for Completed Jobs

Report data for on-line requests

INTRANET GRAPHICAL USER INTERFACE FOR SONET NETWORK MANAGEMENT

RELATIONSHIP TO OTHER APPLICATIONS

This application is a Continuation-in-part of U.S. patent application entitled "System and Method for Tracking and Monitoring Network Elements", Ser. No. 08/671,029, filed Jun. 25, 1996 now U.S. Pat. No. 5,845,062 which is incorporated herein by reference in its entirety.

CROSS-REFERENCE TO OTHER APPLICATIONS

The following applications of common assignee contain some common disclosure as the present application:

U.S. patent application entitled "System and Method for Identifying the Technique Used for Far-End Performance Monitoring of a DS1 at a Customer Service Unit", Ser. No. 08/671,028, filed Jun. 25, 1996 U.S. Pat. No. 5,768,261.

U.S. patent application entitled "System and Method for Formatting Performance Data In a Telecommunications System", Ser. No. 08/670,905, filed Jun. 26, 1996.

U.S. patent application entitled "System and Method for Reported Root Cause Analysis", Ser. No. 08/670,844, filed Jun. 28, 1996.

U.S. patent application entitled "System and Method for Unreported Root Cause Analysis", Ser. No. 08/668,516, filed Jun. 28, 1996.

U.S. patent application entitled "Enhanced Correlated Problem Alert Signals", Ser. No. 08/670,848, filed Jun. 28, 1996.

U.S. patent application entitled "Correlated Problem Alert Signals", Ser. No. 08/673,271, filed Jun. 28, 1996.

U.S. patent application entitled "Raw Performance Monitor Correlated Problem Alert Signals", Ser. No. 08/670,847, filed Jun. 28, 1996.

U.S. patent application entitled "System and Method for Reported Trouble Isolation", Ser. No. 08/672,812, filed Jun. 28, 1996, U.S. Pat. No. 5,704,036.

U.S. patent application entitled "System and Method for Unreported Trouble Isolation", Ser. No. 08/672,513, filed Jun. 28, 1996.

U.S. patent application entitled "Monitor Point Identification", Ser. No. 08/672,512, filed Jun. 28, 1996, U.S. Pat. No. 5,768,255.

U.S. patent application entitled "Service Management Layer Threshold Setting", Ser. No. 08/670,845, filed Jun. 28, 1996.

U.S. patent application entitled "Monitor Point Activation", Ser. No. 08/672,356, filed Jun. 28, 1996.

U.S. patent application entitled "System And Method For The Automated Configuration Of Network Elements In A Telecommunications Network", filed concurrently herewith.

The above-listed applications are incorporated herein by reference in their entireties.

BACKGROUND OF THE INVENTION

1. Field of the Invention

The present invention relates generally to telecommunication network management, and more specifically is directed toward a system and method for using a graphical user interface to remotely monitor and configure network elements.

2. Related Art

There is an ongoing need to improve network monitoring and management techniques at all levels, from the network element level up through the highest system level. Network elements are monitored to provide a detailed predefined set of network element performance data. Examples of performance data and alarm information that can be retrieved from a network element include the number of errored seconds, severely errored seconds, path alarm indication signals, etc.

FIG. 1 illustrates an example of a conventional vendor-controlled network management system 100 that retrieves network performance data from, and configures a group of network elements 110. In this network management system, the operations controller (OPC) 130 is connected to the network elements 101 and 104 via Control Network (CNet) connections 122 and 124, respectively. The network elements 101–104 are referred to collectively as the OPC span of control, or OPC group 110. The network elements 101–104 are interconnected by links 111–113. Links 111–113 represent either intrasite or intersite connections. Intrasite connections can be provided by CNet bridge cables, while intersite connections can be provided via the synchronous optical network (SONET) defined data communications channel (DCC) overhead bytes.

For the network monitoring operation, the OPC 130 periodically interrogates the computer resident within each network element 101–104. The network elements 101–104 provide the OPC 130 with performance and status information. The OPC 130 then provides the collected information to the network manager 140. The network manager 140 retrieves performance and status information from a plurality of network element groups via a plurality of OPCs (not shown).

In a similar fashion, the network manager 140 is also used to configure the network elements 101–104. Examples of types of configuration settings that can be accomplished in this fashion include switching the performance alarms to an 'on' or 'off' state, and setting the threshold parameters used to activate the performance alarms. From the network manager 140 a command is provided to the OPC 130 that is used to configure one or more of the network elements 101–104 within the OPC group 110.

In this conventional network management system 100, the service provider (e.g., MCI Telecommunications Corporation) owns and controls the network elements 110, the OPC 130 and the network manager 140. However, the service provider does not control the content and distribution of the retrieved performance data. Rather, the network element vendors that sell the hardware (i.e. the network elements 110, the OPC 130 and the network manager 140), retain control over both the network management software and the collected data. Specifically, network elements 101–104 are programmed by the vendor to provide only basic predefined information to OPC 130. The retrieved data is then stored in a databases located in the OPCs 130 and the network elements 110. Such databases are also controlled by the vendor. Finally, the vendor generates predefined reports that are provided to the service provider on a network element basis. Effectively, vendors dictate both the type and format of data that is provided to the purchasers of the network elements.

In this situation, a service provider has limited access to its own network data. Customization of the data to be retrieved and the provision of aggregate network-wide reports can be accomplished only through requests to the vendor. This request process is often inefficient and expensive. What is needed is a system and method for maximizing (1) the types of data that are extracted from the network elements, and (2) the availability of the extracted data to the service provider for subsequent analysis.

In addition, in the conventional network management system 100, each network element must be configured manually. That is, a network engineer must manually log on the network manager 140 or OPC 130 and send a set of commands to each of the network elements 101–104 that is to be configured. Alternatively, network engineers can configure the network elements 101–104 by locally attaching a terminal to each of the network element's craft interface (not shown, described below), and manually configuring the network elements 101–104. In either case, both conventional methods involve manually configuring the network elements, one at a time. The conventional method does not provide a network-wide solution. Considering that a typical long distance network comprises many thousands of network elements 101–104, the conventional method of network configuration can be an extremely costly and timely process.

Moreover, the conventional method makes it very difficult to maintain a consistent configuration for the many thousands of network elements 101–104 comprising the communications network. For example, it is desirable to set consistent alarm thresholds for similar types of network elements throughout the network in order to yield more accurate and uniform performance evaluation results. What is needed therefore, is a system and method for automatically configuring the network elements so that a timely and consistent configuration is assured throughout the network.

Additionally, it is desirable to permit shared access to a network management system that is available to service provider personnel throughout a wide geographical area. Further, it is desirable that such shared access be available to a diverse variety of computer systems. What is needed therefore, is a system and method for providing shared access to a network management system to a diverse variety of computer platforms distributed over a wide geographical area.

SUMMARY OF THE INVENTION

Two of the above mentioned needs are satisfied by above referenced U.S. patent applications and the third above referenced need is satisfied by the present invention. Specifically, the patent application entitled "System and Method for Tracking and Monitoring Network Elements" satisfies the above mentioned monitoring needs by providing a network management system that is controlled by the service provider. The Patent Application entitled "System And Method For The Automated Configuration Of Network Elements In A Telecommunications Network", satisfies the above mentioned configuration needs by providing a network management system that automatically configures the network elements. The present invention satisfies the above mentioned shared access needs by providing a graphical user interface that provides shared access to a network management system for a wide variety of diverse computer systems distributed over a large geographical area.

The network management system of the present invention comprises a plurality of controllers that communicate with a desired network element via a switch 56 network. In a preferred embodiment, the network is divided into one or more data communications channel (DCC) groups that include one or more network elements with craft interface ports directly connected to the switch 56 network.

In a preferred embodiment, the network management system is interconnected via a local area network. User requests are initiated from a plurality of workstations that are coupled with a company-wide Intranet. A web server interfaces between the company-wide Intranet and the network management system. Any authorized user can access the network management system via a standard web browser program that communicates with the web server via Hyper-Text Transfer Protocol (HTTP). Such programs are generally available for a wide variety of computer platforms. Hyper-Text Markup Language (HTML) is used by the web server and web browser to provide users with a graphical user interface (GUI) to the network management system.

Accordingly, users can view pre-defined reports of network elements by navigating through a series of HTML web pages from any workstation connected to the Intranet. For example, in a typical implementation of the present invention, performance information from network elements are collected on a daily basis. Typically, pre-formatted HTML performance reports are sent to the web server so that they are available to service provider personnel via the intranet. Accordingly, any user that has access to an Internet terminal can view the latest performance data from any network element by traversing HTML pages in a well-known manner.

Additionally, authorized users throughout the geographical realm of the service provider can make requests that are either processed immediately (on-line requests), or are processed at a later time (batch requests). User requests can be monitor or configuration requests. Generally, HTML is used to provide users with intuitive tools for finding specific information used to view reports and/or submit requests.

A monitor request includes information that identifies a network element and the type of information sought to be retrieved from the network element. A configuration request includes information that identifies a network element and the configuration information. Based upon the request, the network management system identifies a DCC group that includes the network element. Next, the network management system identifies one of the network elements in the identified DCC group that has a craft interface port directly connected to the switch 56 network.

After this identification process, the network management system directs a controller to initiate a call to the network element having a direct connection to the switch 56 network. Through this connection, the controller can access any other network element within the DCC group. The data retrieval process and/or configuration process begins after the desired network element is accessed.

Configuration and data retrieval is facilitated by the controller's emulation of a VT100 terminal. After navigating through a series of craft interface menus, the controller sends configuration data to the network element. In case of data collection, the controller extracts the desired data from the screen display data that is received from the network element. The extracted data is stored in a database. Information from the database is available to a web server so that the information is accessible by any user associated with the service provider from an Intranet terminal.

The foregoing and other features and advantages of the invention will be apparent from the following, more particular description of a preferred embodiment of the invention, as illustrated in the accompanying drawings.

BRIEF DESCRIPTION OF THE FIGURES

In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

The present invention addresses the general problem of effectively retrieving and managing network data from thousands of network elements by providing a graphical user interface that permits shared access to a network management system by a diverse variety of computer systems distributed over a wide geographical region. A web server attached to a preferably company-wide Intranet is used to interface with a network management system. Remote users throughout the company can submit requests and view reports via any workstation attached to the Intranet. Accordingly, users can view pre-defined reports and submit requests by filing out forms and/or navigating through a series of HTML web pages presented by the web server.

Figure 1:
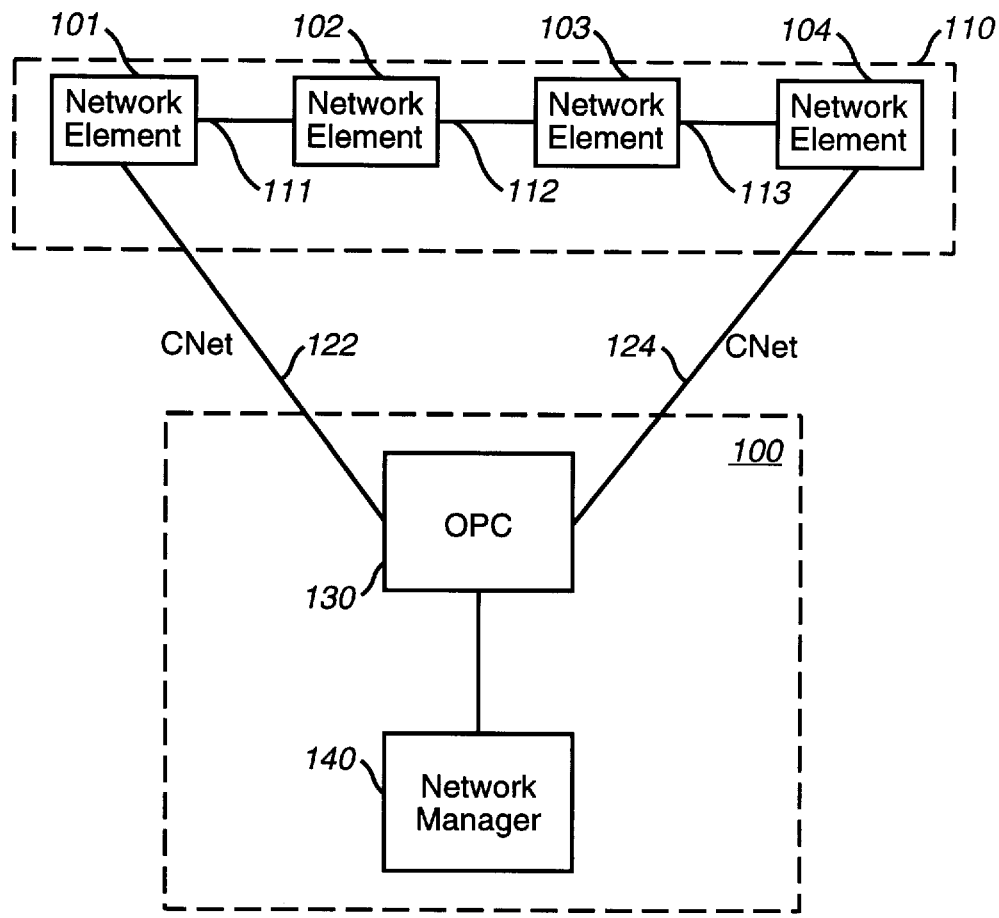
FIG. 1 illustrates a conventional network management system.
Figure 2:
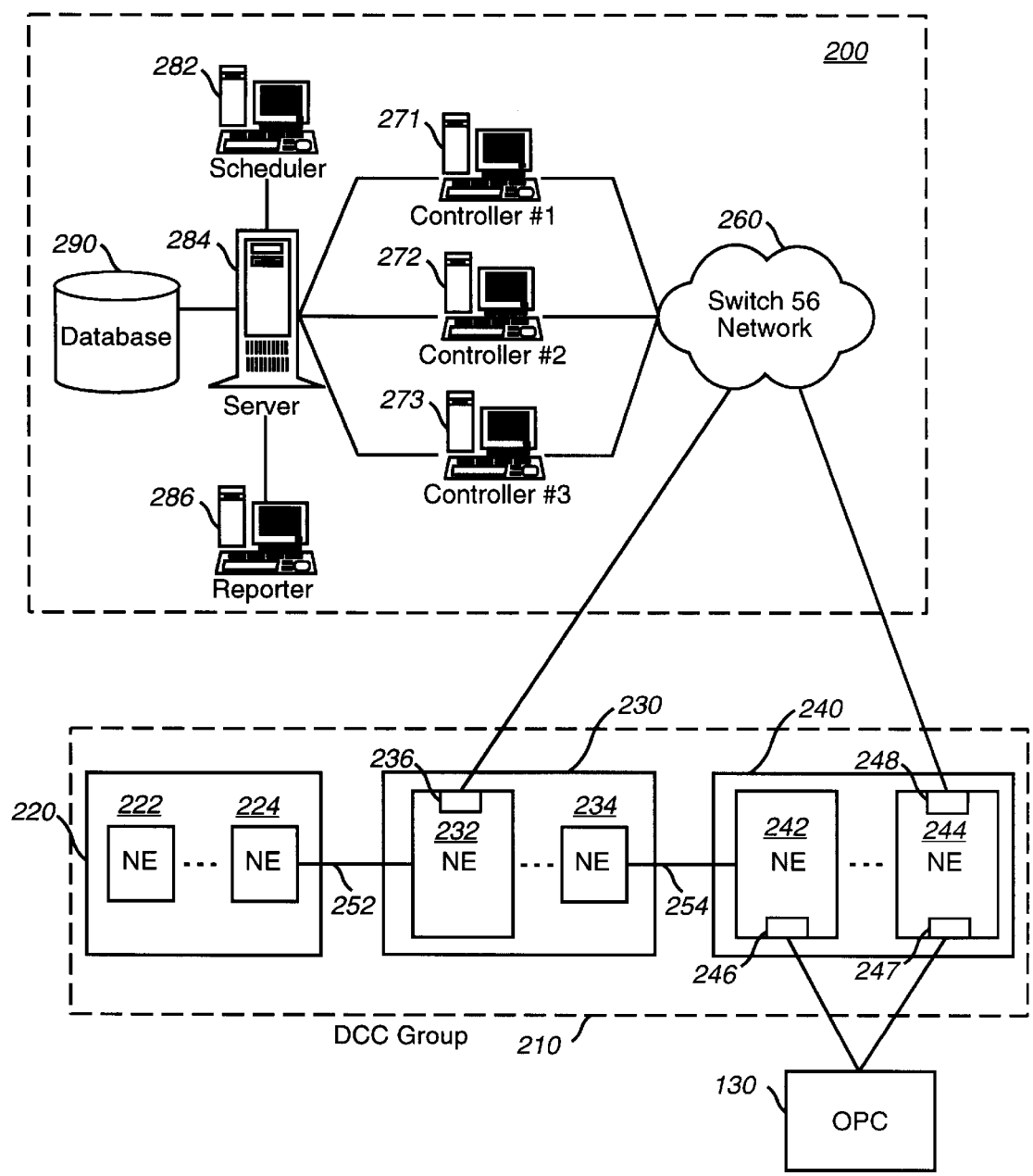
FIGS. 2, 3 and 7 illustrate a network management system according to the present invention.

FIG. 2 illustrates a preferred embodiment of a customer-controlled network management system 200. The network management system 200 includes a communication network, such as a switch 56 network 260, that connects any one of controllers 271–273 to any network element in the service provider's network. The switch 56 network 260 is a controlled 56 kbit/s routing network. It should be understood that other types of communication networks could be used in place of a switch 56 network. A controller 271–273 initiates a connection by first dialing the number that is associated with a network element 232, 244 that is directly connected to switch 56 network 260. These directly connected network elements 232, 244 allow access to any network element in data communications channel group (DCC) 210.

In this example, each controller 271–273 has preferably eight ports in which to connect to switch 56 network 260. In combination the controllers 271–273 can make 24 simultaneous calls to the network elements scattered throughout the network. In an alternative embodiment, the controllers 271–273 are connected to the network elements 222, 224 via a private-line network.

The network management system 200 also includes a scheduler 282, a reporter 286, a server 284 and a database 290. The scheduler 282 coordinates user monitor or configuration requests for the controllers 271–273. The reporter 286 generates customized reports that are based on the collected information that is stored in database 290. These customized reports are defined by the service-provider. Finally, the server 284 coordinates the data retrieval and analysis processes that are initiated by user requests.

Figure 3:
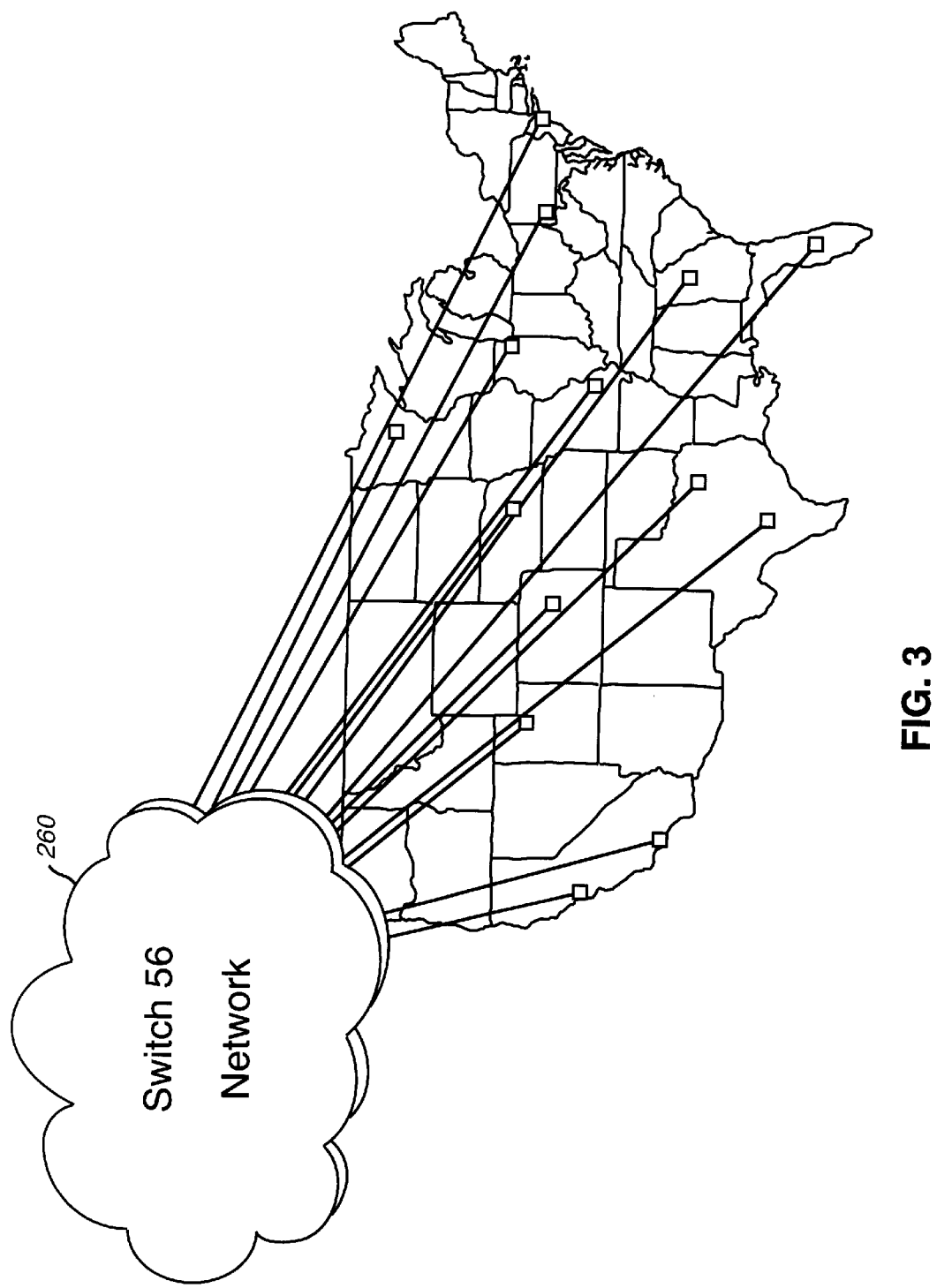

As illustrated in FIG. 3, switch 56 network 260 permits the controllers 271–273 to directly connect to a subset of network elements that are scattered throughout a national network. This subset of network elements provides a connection point between controllers 271–273 and the network elements within the various DCC groups. FIG. 2 illustrates an example of a single DCC group 210. DCC group 210 includes a plurality of OPC groups 220, 230, 240. OPC groups 220, 230, 240 are interconnected by communication links 252, 254. Communication links 252, 254 can represent a communication channel established via the SONET DCC overhead bytes. As defined in the context of network management system 100, each OPC group 220, 230, 240 is associated with a single OPC 130. For convenience, only OPC 130 associated with network element group 240 is shown.

The OPC groups 220, 230, 240 each include a plurality of network elements. The OPC group 220 includes the network elements 222 and 224, the OPC group 230 includes the network elements 232 and 234, and the OPC group 240 includes network elements 242 and 244. With reference to the OPC group 240, the OPC 130 interfaces with the network elements 242 and 244 via the CNet ports 246 and 247, respectively. As noted above, the CNet ports 246 and 247 allow the vendor-controlled OPC 130 to retrieve a basic vendor-defined information set from each of the network elements in OPC group 240. In addition, the CNet ports 246 and 247 allow the vendor controlled OPC 130 to configure each of the network elements in the OPC group 240.

In contrast to the vendor-controlled interface via the CNet ports 246 and 247, network management system 200 interfaces with the network elements in the DCC group 210 via the craft interface ports 226 and 248 on the network elements 232 and 244, respectively. One or more connection points between the switch 56 network 260 and a DCC group can exist. The craft interface ports 236 and 248 represent the connection points between controllers 271–273 and each of the network elements 222, 224, 232, 234, 242, 244 in the DCC group 210. In other words, the connection points at the craft interface ports 236, 248 allow the controllers 271–273 to interrogate the computer that is resident in any network elements in the DCC group 210. This method of interrogation capitalizes on the provision of internal data processing capabilities within each of the network elements. In addition, the connection points at the craft interface ports 236, 248 allow the controllers 271–273 to configure the computer that is resident in any network element in the DCC group 210.

As noted above, communication between the various OPC groups 220, 230, 240 in the DCC group 210 is provided by the links 252, 254. The links 252, 254 can be implemented using the SONET DCC overhead bytes. In the preferred embodiment, a DCC group can include over a hundred network elements. In effect, the various communication links within the DCC group 210 allow the computers within the network elements to operate as a local area network (LAN). To access a particular DCC group, the controllers 271–273 need only dial a number associated with a network element that is directly connected to the switch 56 network 260. Thereafter, the controllers 271–273 are provided with complete access to any of the network elements in the chosen DCC group.

In the network management mode, through the use of the craft interface at network element ports 236 and 248, the controllers 271–273 are allowed to retrieve significantly more information from a network element as compared to OPC 130. For example, in addition to the predefined set of alarm and performance data, the controllers 271–273 can also retrieve card level inventory data (e.g., serial numbers and software versions), tributary layout information, laser bias information, etc. Effectively, all information known to the network element computer is retrievable via craft interface ports 236, 248.

Generally, any authorized user associated with the service provider organization can direct one of controllers 271–273 to query a specific network element within the service provider's network. In addition, any authorized user associated with the service provider organization can direct one of controllers 271–273 to configure a specific network element within the service provider's network.

Figure 5:
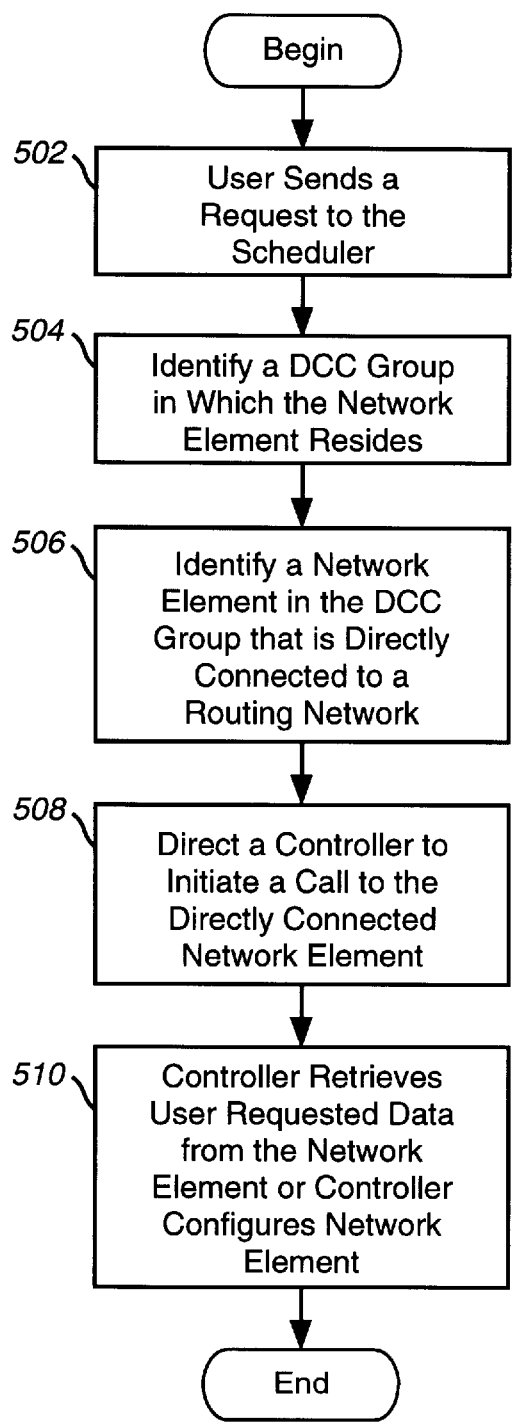
FIGS. 5, 8–12 illustrate flow charts depicting various processes that can be used in a preferred embodiment of the present invention.

FIG. 5 illustrates a flow chart of the user-initiated query or configuration process. First, at step 502, a user sends a request to the scheduler 282 for access to a particular network element. This request includes information that identifies a network element. In addition, for a query operation the user specifies the type of network management data that is sought to be retrieved from the network element. For a configuration operation, the user specifies configuration data for the network element.

In one embodiment, the scheduler 282 uses the received request to generate a series of instructions that allow a controller 271–273 to navigate through a series of menu screens. In an alternative embodiment, the request itself includes script information that directs a controller's navigation through a series of menus screens. The use of menu screens to retrieve network element data and to configure network elements is described in greater detail below.

In one example, a user may request information on the operating condition (e.g., laser bias information) of a specific network element. In other examples, a user may schedule a series of periodic requests that seek to gather information from a group of network elements. These periodic requests may seek to gather card-level inventory information, tributary layout information, etc. from all of the network elements in the network for tracking purposes. In either case, the scheduler 282 processes the requests by identifying the connections to be made by controllers 271–273. In yet another example, a user may request to turn-on an optical performance alarm, or may request that new threshold parameters be set to trigger an optical performance alarm.

At step 504, the scheduler 282 identifies the DCC group in which the network element specified by the user resides. Next, at step 506, the scheduler 282 identifies one of the network elements in the DCC group that is directly connected to switch 56 network 260. In the example of FIG. 2, the network elements 232 and 244 of DCC group 210 are directly connected to switch 56 network 260. Each of these directly connected network elements is assigned an identifying number that is used by controllers 271–273 in making a call.

At step 508, the scheduler 282 instructs one of the controllers 271–273 to make a call to a directly connected network element. Communication with the directly connected network element allows one of controllers 271–273 to access the information from, or configure any of the network elements in the DCC group. This access is provided by the LAN-like configuration that is created by the communication links that interconnect the network elements in the DCC group. Once communication has been established with the network element, the controller 271–273 can then retrieve any data that may be requested by the user, or the controller 271–273 may configure any of the network elements within the DCC group 210. This process is represented by step 510.

The retrieval and/or configuration process at step 510 is facilitated by the emulation by controllers 271–273 of a VT100 terminal typically used in a craft interface connection. Through this emulation process, a controller 271–273 can navigate through a series of menu screens to identify the menu option that will produce the data requested or produce the configuration results requested by the user.

It should be appreciated that the method described above, with reference to FIG. 5, can be used to monitor and configure network elements on network-wide basis. For example, the scheduler 282 can be programmed to perform periodic jobs that direct the controllers 271–273 to visit each network element within the telecommunications network, in a manner as described above. In this fashion the performance of the entire telecommunications network can be monitored in a periodic and consistent fashion. For example, nightly 'walk-abouts' can be scheduled so that network-wide performance data is available to the service provider on a daily basis.

In a similar fashion, the scheduler 282 can be programmed to perform periodic configurations on a network-wide basis. For example, it may be desired to periodically turn-on performance alarms. Alarms that are switched off, for one reason or another, will cause performance problems to go unnoticed. Alarms that have been inadvertently switched-off have proven to be troublesome for the telecommunications industry. In many cases, alarms are never turned on in newly deployed network elements. Thus, the present invention can be used to systematically turn on all desired alarms within the entire telecommunications network. This process can be repeated on a periodic basis, to assure that alarms are turned on for newly deployed network elements and for any other network elements in which alarms are inadvertently switched-off.

Additionally, the present invention can be used to set alarm threshold parameters for network elements on a network-wide basis. This will assure that consistent parameters are used throughout the network in order to increase the accuracy and reliability of the performance reports on a network-wide basis. Once again, this process can be repeated on a periodic basis to assure that consistent values for all network elements within the network. In addition, this process can be repeated whenever it is desired to change the values of the alarm threshold parameters. This aspect of the present invention facilitates experimentation with the alarm threshold parameter values, so that optimal values can be determined.

Figure 4:
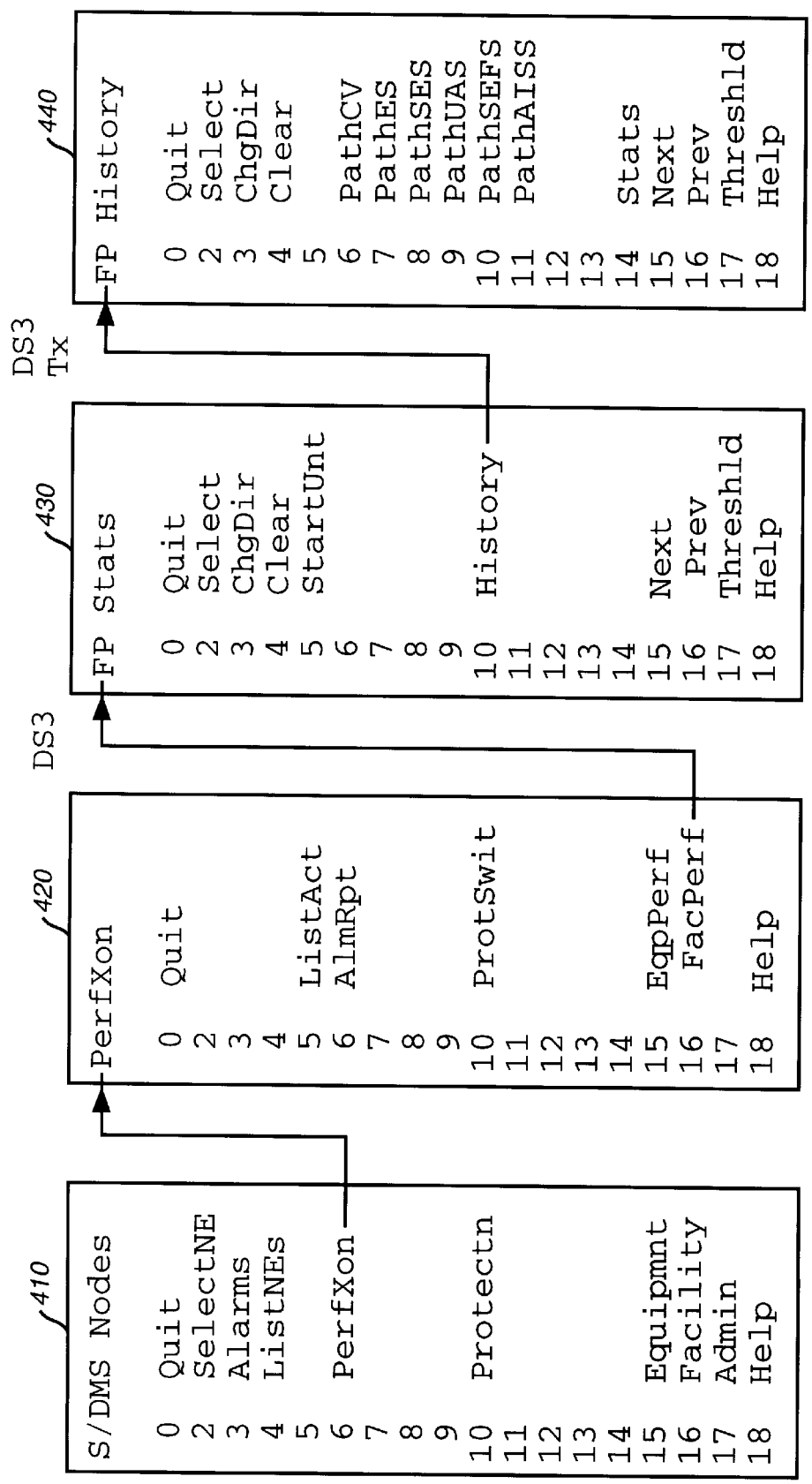
FIG. 4 illustrates an example of a series of menus that are navigated through the craft interface of a network element.

An example of a sequence of menu screens 410, 420, 430, 440 used in the communication between controllers 271–273 and the network elements is illustrated in FIG. 4. In this example, a data request is being processed through a series of pre-defined menu screens 410–440. The menu screens 410–440 are typically defined by the vendor. Starting at menu screen 410, a controller 271–273 automatically selects the type of information to be extracted. In this example the options include alarm information (3), performance monitoring information (6), protection information (10), facility information (16), etc.

In the example of FIG. 4, a controller 271–273 automatically chooses in sequence, the choice of the performance monitoring option (6) in menu screen 410, the facility performance option (16) in the menu screen 420, and the history option (10) in the menu screen 430. At menu screen 440, the controller 271–273 is presented with various performance monitoring parameters that can be retrieved. For example, controller 271–273 can select the historical data for path-level errored seconds (PathES) or path-level severely errored seconds (PathSES). After the controller 271–273 selects a specific parameter identified by the user request, the computer in the network element being queried returns a result to be displayed on the emulated VT100 screen. Thus, the controller 271–273 selects the appropriate menu items to perform the intended function. If a configuration request is desired, such as a request to turn on a performance alarm, another set of menu screens (not shown) would be traversed, in a similar fashion as described above.

The results to be retrieved is obtained by a "screen-scraping" method. In this process, the controller 271–273 receives data to be displayed on a VT100 screen or other computer display screen. This display data is in a data format that includes row position information, column position information, and ASCII encoded text to be displayed at the specified row and column positions. Since a controller 271–273 knows the position at which the returned result is to be displayed, the controller 271–273 can extract the ASCII encoded information that is associated with the known row and column position identifiers. Thereafter, the ASCII coded information is converted and stored in database 290.

Note that during the processing of requests, information is typically retrieved by the controllers 271–273 via the "screen-scraping" method as described above. For example, during the processing of a configuration request to set alarm parameters, several menu screens, such as the menu screen 410, are typically traversed by the controllers 271–273. Each new menu screen is typically analyzed via the "screen-scraping" method to verify the progress of the operation. Thus, as the term is used herein, retrieving information from the network elements, not only refers to retrieving result data, such as status information associated with a monitor request, but it also refers to retrieving menu screen data associated with the processing of any type of request.

The database 290 stores network element data extracted by the controllers 271–273 in response to user requests that are generated by any user associated or authorized by the service provider. As noted above, most of this network element data is not available through conventional network management system 100. As a further benefit, information stored in the database 290 can be extracted and analyzed by any user or group associated with the service provider. Additionally, any user or group associated with the service provider can remotely configure any or all of the network elements throughout the entire network.

Thus, while the network management system 100 typically provides performance data reports for specific network elements, the network management system 200 allows the generation of reports and configuration on a network-wide basis. For example, trend statistics can be generated across multiple network elements. These trend statistics allow network management to be performed properly at a higher network level rather than at the network element level.

Figure 7:
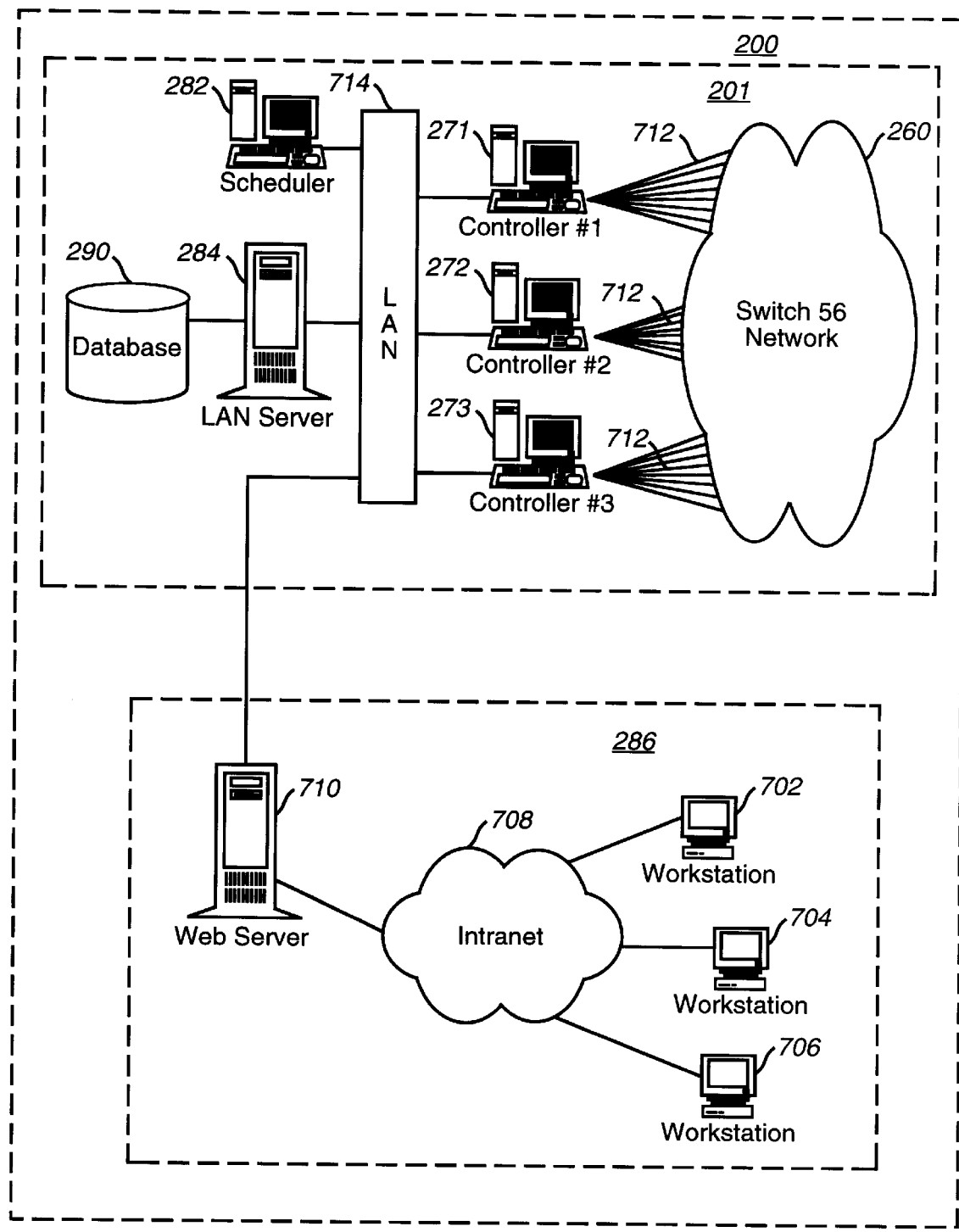

FIG. 7 depicts a more detailed block diagram of a preferred embodiment of the network manager 200. As shown, the elements comprising the network management system 201 are interconnected via a Local Area Network (LAN) 714. A typical example of a particular LAN that can be used to implement an embodiment of the present invention is a NOVELL® LAN. The database 290 is preferably shared by the network elements within the network management system 201. For example, the LAN server 284 is configured so that access rights to the database 290 are granted to the controllers 271–273, the scheduler 282, and the reporter 286.

The controllers 271–273 can be implemented with a general purpose computer system. An exemplary computer system that can be used to implement the controllers 271–273 is described below with reference to FIG. 6. As noted above, each controller 271–273 has a plurality of ports to connect to the switch 56 network 260. This is depicted by the plurality of transmission lines 712 connected between each controller 271–273 and the switch 56 network 260. The number of ports used depends on the specific implementation of the present invention. For example a "Digiboard", manufactured by DIGI Incorporated comprises 8-16 asynchronous ports for each controller 271–273.

In a preferred embodiment of the present invention, the reporter 286 comprises an Intranet 708, coupled with a web server 710 and a plurality of workstations 702–706. The web server 710 is coupled with the LAN 714 of the network management system 201. Typically, a fire-wall or similar device (not shown) is placed between the web server 710 and the network management system 201 for security purposes. The firewall prevents the unauthorized dissemination of confidential information from the Intranet 708.

In operation, network management information is presented to the user at any one of the plurality of workstations 702–706. In addition, network elements can be configured via any one of the plurality of workstations 702–706 coupled with the Intranet 706, as described below.

By using the Intranet 708, the present invention provides a distributed means for reporting status from and/or configuring the thousands of network elements within the telecommunications network. A particular advantage provided by the present invention is that the plurality of workstations 702–706 can be spread across a very large geographical region. Further, the use of the Intranet 708 provides a means for connectivity between the network management system 201 and a plurality of workstations 702–706 with diverse computer platforms. Accordingly, any type of workstation capable of running a commonly available Internet Browser program, such as Netscape's Navigator, or Microsoft's Internet Explorer, can communicate with the network management system 201. Generally, such web browsers communicate with the web servers via a communication protocol known as HyperText Transfer Protocol (HTTP). Thus, a diverse variety of workstations have access to network element reports and real-time requests for the monitoring and/or configuration of any of the network elements throughout the telecommunications network.

Figure 8:
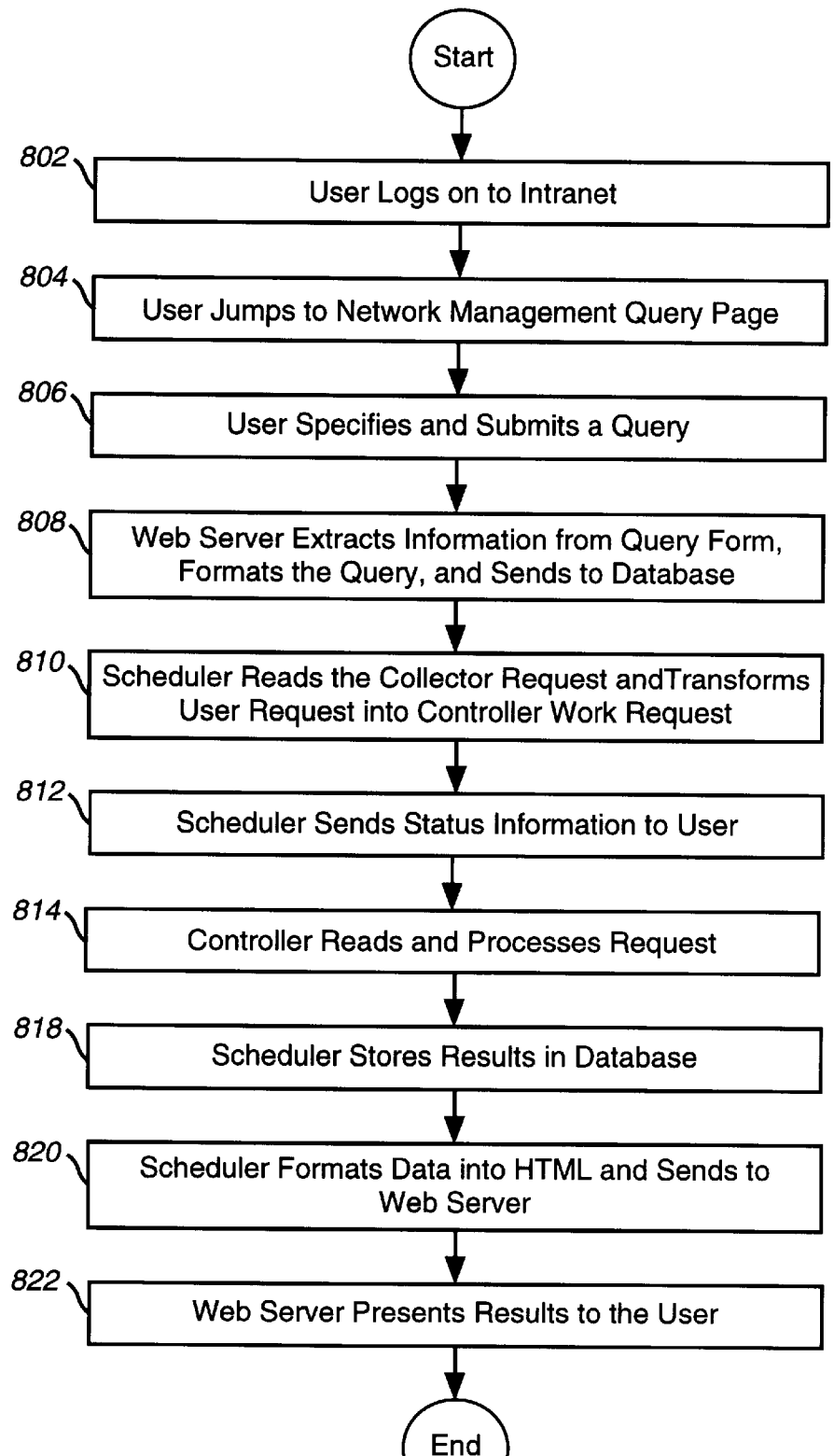

FIG. 8 is a flowchart of a process that illustrates how a user submits an on-line request to the network management system 201, from one of the workstations 702–704 connected to the Intranet 708 according to an embodiment of the present invention. For the purposes of this example, it is assumed that the user is at the workstation 702 and the request is processed by the controller 712. Note however, that any workstation 702–706 coupled with the Intranet 708 can be used to submit such a request. Further, any controller 271–273 coupled with the LAN 714 can be used to process such a request. The number of workstations 702–706 and the number of controllers 271–273 that are used to implement a specific embodiment of the present invention, will vary depending on the needs and desires of the service provider.

The process begins with step 802. In step 802 the user logs onto the intranet 708. This step is accomplished in the usual fashion by entering a user ID and password from the workstation 702. Note, this step may not be necessary for some implementations of the present invention. In step 804 the user jumps to the network management on-line request page. This step is also accomplished in the usual fashion by selecting an item from a list of items that represent options available to the user. Typically the user is presented with a list of options in the form of hypertext links, or Universal Resource Locations (URLs). To jump to the on-line request page, the user simply selects the on-line request page option by clicking the mouse pointer on the associated list item that represents the on-line request page option. Once the option is selected, the current list of options is replaced by the on-line request page. Control then passes to step 806.

In step 806, the user specifies a particular on-line request by filling out a form that is presented on the on-line request page. This step generally involves the user selecting choices from predetermined lists of choices, and/or filling out text entry fields on the on-line request form provided. The type of form(s) that are provided by the web server 710 in step 806 depends on the specific implementation of the present invention. In a simplified implementation, the user is presented with simple text entry fields used to specify: (1) the identification number(s) of network element(s); and (2) the type of report or configuration desired. In a preferred embodiment, the user is provided with the tools to 'drill-down' information pertaining to the network elements in a more user-friendly manner. In this fashion, network elements can be addressed without having specific detailed knowledge about the particular network elements.

For example, suppose a user does not know the identification number of a particular network element that is of interest. This is not an uncommon scenario considering that typical long distance providers have control over many thousands of network elements distributed throughout a large geographical area. Accordingly, the user is presented with a map that represents the geographical area comprising the network. For the purposes of this example, assume that a map of the United States is presented. From this map, the user selects a particular state. Once a state is selected, the user is presented with a list of sites where network elements are located. Once a site is selected, the user is presented with a list of network elements within the site. Finally, the user selects one or more network elements that is the subject of the request.

In addition to the above, the user is presented with a list of reports that can be generated with the selected network element(s), or a list of configuration options that are available. Note that this is one example of a technique that can be used to specify a on-line request in step 806. Many other techniques can be used in addition to the example presented above. The choice depends upon the specific implementation of the present invention. In any case, once a on-line request is formulated in step 806, the user clicks a button to submit the on-line request to the web server 710. Control then passes to step 808.

Note that in addition to an on-line request for a report, authorized users can also submit a request to configure one or more network elements within the communications network. For example, a user selecting such a request will be presented with a series of choices that represent configuration options that are possible for the selected network element(s). Such options include setting the on-off status of various performance and/or optical performance alarms, and setting or changing alarm threshold parameters for such alarms.

Next, in step 808, the web server 710 processes the request form completed in step 806 and extracts necessary information therefrom. This information is then formatted for the database 290. For example, the web server 710 determines from the on-line request: (1) the types of report and/or configurations that are desired and (2) the identification numbers of the network elements that are involved in the request. This information is then formatted for the database 290. The formatted information is stored to the database 290.

In step 810, the scheduler 282 reads the on-line user request from the database 290 and translates it into one or more controller work request(s). A process that can be used by the scheduler to read and process such requests is described below with reference to FIG. 12. Typically this transformation involves breaking up the network elements into groups of network elements, where each group comprises network elements within the same DCC group 210. In this manner, each group can be processed by a controller 271–273 during a single telephone call over the switch 56 network 260. Thus, each group is translated into a single controller work request. In addition, the telephone number of the directly connected network element, such as network element 244, associated with the DCC 210 is specified. Accordingly, a single user request is converted into one or more controller work requests. In addition, as described below, each controller work request contains a list of all the network elements to be operated upon, the type of operation required of each network element, and the time to process the request.

In this example, an on-line request is desired. Thus, based on the current workload of the controllers 271–273, the scheduler determines when the on-line request can be serviced by the controllers. Typically this is in the form of a 'time window' comprising a beginning time and an ending time, as described below. If possible, the time window is specified such that the request is processed immediately.

Preferably, controller work requests reside in a shared data table within the database 290. The shared data table is referred to herein as a dispatch table. The dispatch table contains work requests for each outgoing call via the switch 56 network 260. As stated, each work request specifies a priority, a time/date window, and a list of all of the network elements involved in the work request. Work requests are only processed if a controller receives the request within the specified time window. For multiple work requests that fall within the same time window, the request with the highest priority gets processed first. Details of the dispatch table and such priority processing is presented below.

In step 812, the scheduler 282 sends status information to the user at the terminal 702. This information typically includes an acknowledgment of the request, an estimated time for the completion of the request and where to find the results. In addition, the scheduler determines whether the user is authorized to make the request. If the user is not authorized to make the request, the scheduler will not process the request and sends a notification to the web server 710 indicating that the user is not authorized to perform that function. If however, the user is authorized, the scheduler sends information to the user that indicates the approximate time that the request will be processed. This estimate is based on the current workload of the controllers 271–273 and the nature of the request. In addition, the user will be presented with information that identifies where the results can be found on the web server 710. For example, the user is provided some kind of identification that is used to find the report when it is published on the web server 710. For example, the web server 71 0 may send a messages such as 'The results of the report will be posted on the XXX report page, under the heading of YY.' Additionally, an e-mail message may be sent to the user upon delivery of the report to the web server to notify the user that the report is ready to be viewed by the web browser.

In a preferred embodiment, the user is notified and presented with the results in a user request browser window.

For example, web browser programming tools such as Java® by Sun Microsystems, or ActiveX®, by Microsoft Corporation, can be used to launch a new thread or applet, when the user submits a request. The applet is used to display a new and separate browser window which maintains communication links with a web page used to display results of the user request. In this fashion, the results page is updated with the results of the user request as soon as the results are available. If the user logs off the web browser before the results are available, the user may be presented with an option to re-launch the applet at a subsequent time to view the results of the user query. In addition to the examples presented, other methods may be used to report the results of a user request without departing from the principles disclosed herein. Such methods will be apparent to those skilled in the relevant arts. As such, the example used herein should not be construed to limit the scope and breadth of the present invention.

Next, in step 814, the controller reads and processes the request. As described with reference to the flowchart in FIG. 12, the controller 271–273 reads the request from the dispatch table in the shared database 290. As stated, whenever the controllers 271–273 are not busy processing requests, (i.e. whenever a port 712 is free), additional requests are read from the dispatch table. Additionally, the scheduler 282 can designate a request as a high priority request. Moreover, the scheduler can assign particular requests to particular controllers. Accordingly, it may be desired to reserve one or more controllers to process on-line requests. In this fashion, it is more likely that high-priority on-line requests will be processed in real-time. The number of controllers 271–273 used and the use of dedicated controllers depends on the specific needs of the service provider. An advantage of the present invention is that the number of controllers 271–273 and/or the number of dedicated controllers can be easily altered at any time. In addition, it may be desirable to dedicate certain controllers for on-line requests during the daytime hours and then un-dedicate those controllers during the night. In this fashion, more dedicated controllers are available when numerous on-line requests are likely, and more non-dedicated controllers are available when daily performance reports are typically generated.

In step 818, the scheduler 282 stores the results into the database 290. This process is further described herein with reference to the flowchart in FIG. 10. In step 820, the scheduler formats the results data from the database 290 into Hypertext markup language (HTML) and sends it to the Web server 710. This process is further described below with reference to the flowchart in FIG. 11. Next control passes to step 822. In step 822, the web server 710 presents results to the user as described above.

Figure 9:
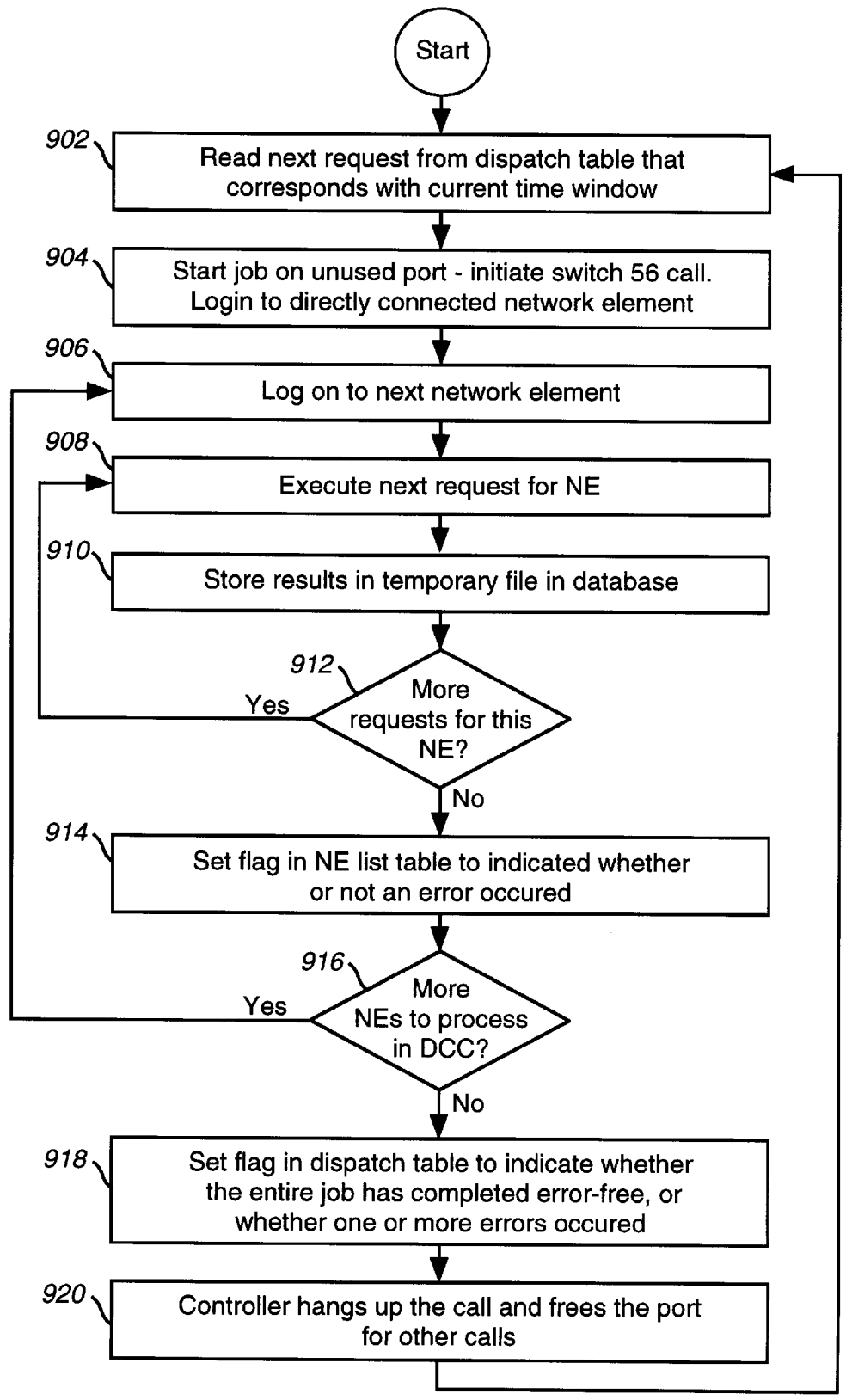

FIG. 9 depicts a flowchart of a process that can be used by the controllers 271–273. For the purposes of this example, it is assumed that the controller 271 is processing a work request that is directed to the DCC group 210. The process begins with step 902. In step 902 the controller 271 reads the next request from the dispatch table that corresponds with the current time window. As stated, a typical controller work request comprises (1) a list of network elements and the operations to be performed thereon; (2) a time/date window in which to process the request; and (3) the priority of the request. In addition, a specific controller identifier can be specified. If this optional field is specified, only the controller 271–273 that matches the specified identifier can process the request. This field in the dispatch table facilitates the use of dedicated controllers, as previously described.

In a preferred embodiment, the controller 271 first searches the dispatch table for jobs that fall into the current time/date window and have a high priority. If there are no high priority requests that fall within the current time window, the table is searched for the next priority, and so on. In this fashion, work requests having higher priorities are processed before work requests having lower priorities. Next, in step 904, the controller 271–273 dials the telephone number that is associated with the directly connected network element, as specified in the work request. Using the DCC group 210 as an example, this could be the network element 232 or the network element 244. For illustrative purposes, it is assumed that the network element 244 is specified in the work request. Thus, dialing this telephone number causes a call to be dispatched into the switch 56 network 260 and answered by the network element 244. Next, the controller 271 logs on to the computer that resides in the network element 244.

In step 906, the controller 271 logs on to the next network element specified in the work request. In step 908, the work request for the current network element is processed. For example, for a monitor request, performance data may be retrieved from the network element. In the case of a configuration request, the current network element is configured. Next, in step 910, the results are stored in a temporary file within the database 290. In step 912, the controller 271 determines if there any more requests to process for the current network element. If so, steps 908–912 are repeated until all requests are processed for the current network element. When all requests have been processed for the current network element, control passes to step 914.

In step 914, another shared table referred to as the network element list (NE list) is updated to indicate whether or not any errors occurred during the processing of the network element just processed. If one or more errors occurred, the scheduler 282 re-schedules the work requests for the network element, as described below with reference to FIG. 10. Next, in step 916, the controller 271 determines if there are any more network elements to be processed within the DCC group 210. If so, steps 906–916 are repeated until all network elements are processed. When all network elements have been processed, control passes to step 918.

In step 918, the current job entry within the dispatch table is updated to indicate whether any errors occurred while processing the current job request. Specifically, a completion field in the dispatch table is updated with a value to indicate whether: (1) the job has completed successfully; or (2) the job has completed with errors. As described below with reference to FIG. 10, if the job contains errors, one or more tasks will be rescheduled by the scheduler 282. In step 920, the controller 271 terminates the call. The port 712 that was used to process the current work order is now free to process additional work orders. Thus, control passes back to step 902, where additional work orders can be processed.

As previously noted, each controller 271–273 is connected to the switch 56 network 260 via multiple asynchronous ports 712. Thus, multiple work orders can be processed simultaneously by each controller 271–273. This is accomplished by running a multitreaded, multitasking operating system on each of the controllers 271–273. An example of such an operating system is Windows NT®, manufactured by Microsoft Corporation. Accordingly, multiple instances of the controller process depicted by the flowchart in FIG. 9, are simultaneously executed on each of the controllers 271–273. The number of instances correspond directly with the number of ports 271 on each of the controllers 271–273.

Figure 10:
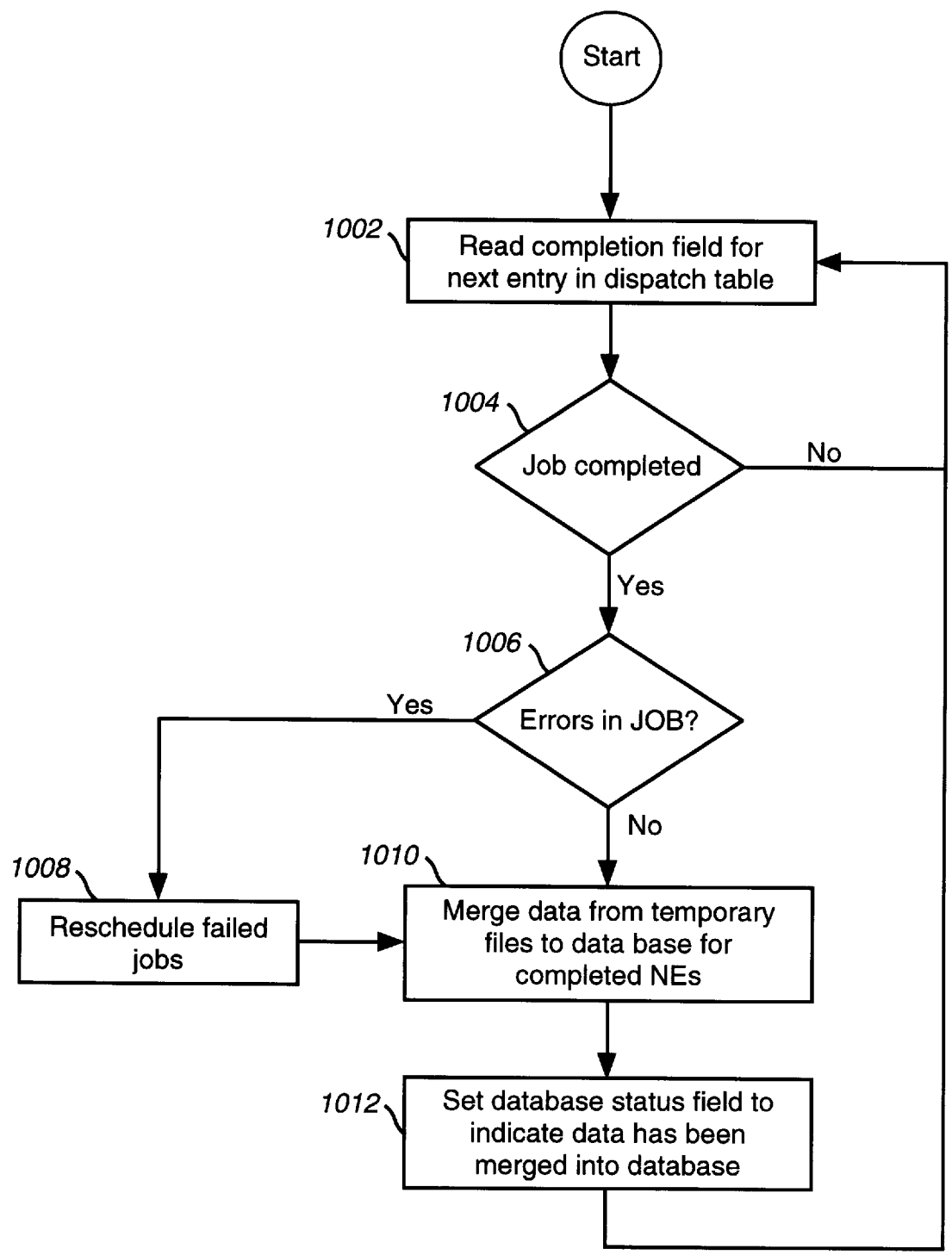
Figure 11:
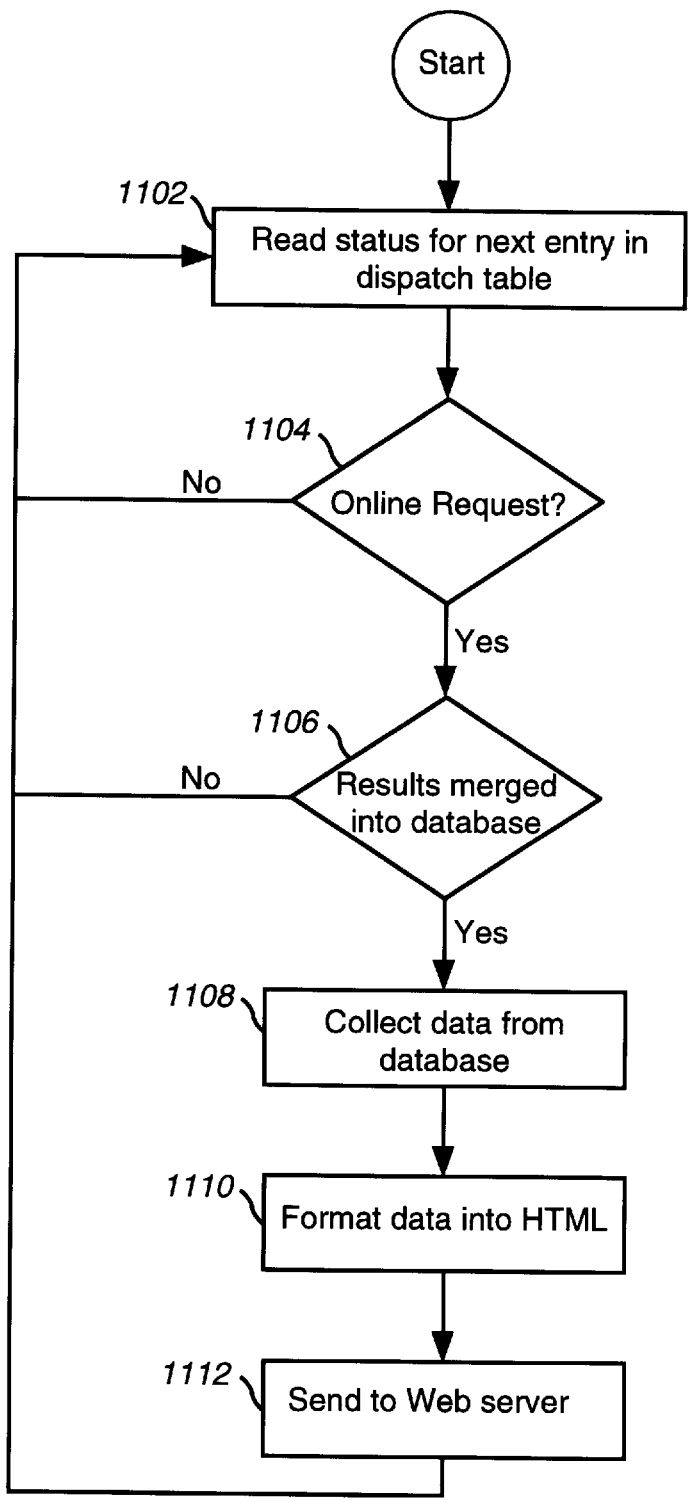
Figure 12:
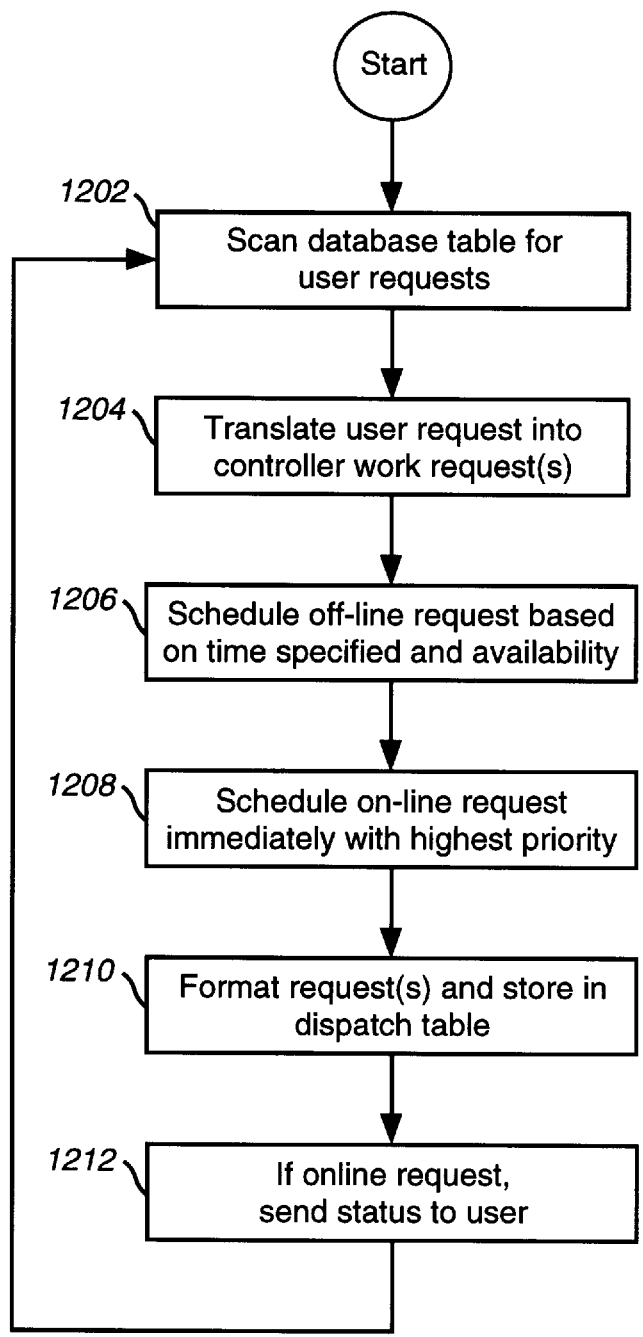

In the following examples, three separate processes are described with references to FIGS. 10, 11 and 12. Note that the processes described below are each separate and distinct processes that are typically executed independently of each other. For convenience, each of the processes is described as being executed by the scheduler 282. In one embodiment, this is accomplished by running a multitreaded, multitasking operating system such as Windows NT® on the scheduler 282. In another embodiment, separate computers are be used to run each of the processes described below. In any event, a single scheduler 282 is used for exemplary purposes and should not be construed to limit the scope and breadth of the present invention.

An example of a process that can be used to process user requests will now be described with reference to the flowchart in FIG. 12. The process begins with step 1202. In step 1202 the database 290 is searched for the presence of user requests. In a preferred embodiment, user requests are stored in a single shared request table within the database 290. Thus, the scheduler in step 1202, scans the user request table to determine if outstanding user requests are present. If so, the process continues with step 1204.

In step 1204, the scheduler 282 translates the user request into one or more controller work request(s). Typically this transformation involves several steps. First, the network elements that are specified in the request are arranged into groups that coincide with their DCC group 210. Each set of network elements that fall into a single DCC group 210 are converted into a single controller work request that can be processed by a controller 271–273 during a single 260 switched call. Accordingly, each user request is translated into one or more controller work requests. Next, the telephone number of the directly connected network element, such as network element 244 is specified for each work request. Next, a list of network elements and the operations to be performed thereon is specified. Finally a priority is assigned for each work request. For on-line user requests, the highest priority is typically specified.

Next, in steps 1206 and 1208, the user request is scheduled. This involves assigning a time/date window, comprising a beginning time and date and an ending time and date for the request. As indicated in step 1206, for off-line requests, the determination of the time window depends on the current work that is scheduled for the controllers 271–273 and the requested time specified in the user request (if any). As indicated in step 1208, online requests are typically scheduled immediately if possible. In step 1210, the completed work request(s) is (are) stored in the dispatch table and control passes to step 1212. In step 1212, the scheduler sends status information to the user. As previously described, the status can be reported in an E-mail message, on the user request web page, or on a separate applet-launched user result web page.

A process that can be used to merge data into the master database table in the database 290 will now be described with reference to the flowchart in FIG. 10. The master database table typically contains the latest available information pertaining to the network elements within the telecommunications network. This table gets updated periodically with the information from the controllers 271–273 pursuant to processed work requests. The process depicted in FIG. 10 is used to permanently store results from completed controller work requests into the master database table in the database 290. As noted with reference to FIG. 9, immediate results from controller work requests are temporarily stored in data files (see step 910 above) before being merged into the master database table.

The process begins with step 1002. In step 1002, the scheduler reads the next entry in the dispatch table. Specifically, as steps 1002 and 1004 indicate, the completion field is read to determine whether or not the work request has been completed. If the work request has not been completed control passes to step 1002, where the scheduler reads the next entry in the dispatch table. As indicated, steps 1002 and 1004 are repeated until the scheduler finds a work request that has been completed, and control passes to step 1006.

Note that in a preferred embodiment of the present invention, the controller 271–273 updates the value of the completion field within the dispatch table upon the completion of a work request. For example, if a work request has completed but contains errors, the value of the completion field is changed from 'I' (incomplete) to 'E' (complete, but contains errors). Alternatively if a work request has completed with no errors, the completion field is set to a value of 'F' (finished with no errors).

Next, in step 1006, the scheduler 282 determines if any errors have occurred by examining the completion field as described above. If no errors occurred, control passes to step 1010. If errors occurred, the NE list table, as described in step 914 above, is examined to determine which network elements caused the errors. Once the list of network elements is determined, they are rescheduled in another work request. Next, control passes to step 1010. In step 1010 data from the work request is stored in the master database table in the database 290. The temporary file is then discarded. Finally, control passes back to step 1002, where the scheduler searches for the next completed work request. As indicated, this process is repeated continuously.

A process that can be used to report data to the web server 710 for on-line requests will now be described with reference to the flowchart in FIG. 11. The process begins with step 1102. In step 1102, the scheduler reads the next entry in the dispatch table. Specifically, the status field is read to determine whether or not the work request is an on-line request, as indicated by steps 1102 and 1104. If the current request in not an on-line request, control passes back to step 1102. As indicated, steps 1102–1104 are repeated until an on-line request is found. Once an on-line request is found, control passes to step 1106.

In step 1106 the scheduler determines whether the results have been merged into the master table in the database 290, as described above. This is determined by examining a merge-data status field in the dispatch table. If the data has not been merged, control passes back to step 1102. If results have been merged, control passes to step 1108.

In step 1108, the scheduler collects the data from the master table in the database 290. Next as step 1110 indicates, the data collected from the database 290 is formatted into HTML. Next, in step 1112, the formatted HTML document, is sent to the web server 710, so that it can be displayed to the user as previously described.

Generally, a similar process is used to report data for off-line user requests. However, in a preferred embodiment, two separate processes are used in order to assure that data pursuant to on-line request are processed in a timely manner. Typically, the process to report data for on-line user requests is run more often than the process used to report off-line requests. For example, the process to report data for off-line requests may be run every hour, while the process to report data for on-line requests is run continuously. Moreover, by separating the two processes, the on-line request reporting process can proceed more quickly and efficiently.

Figure 6:
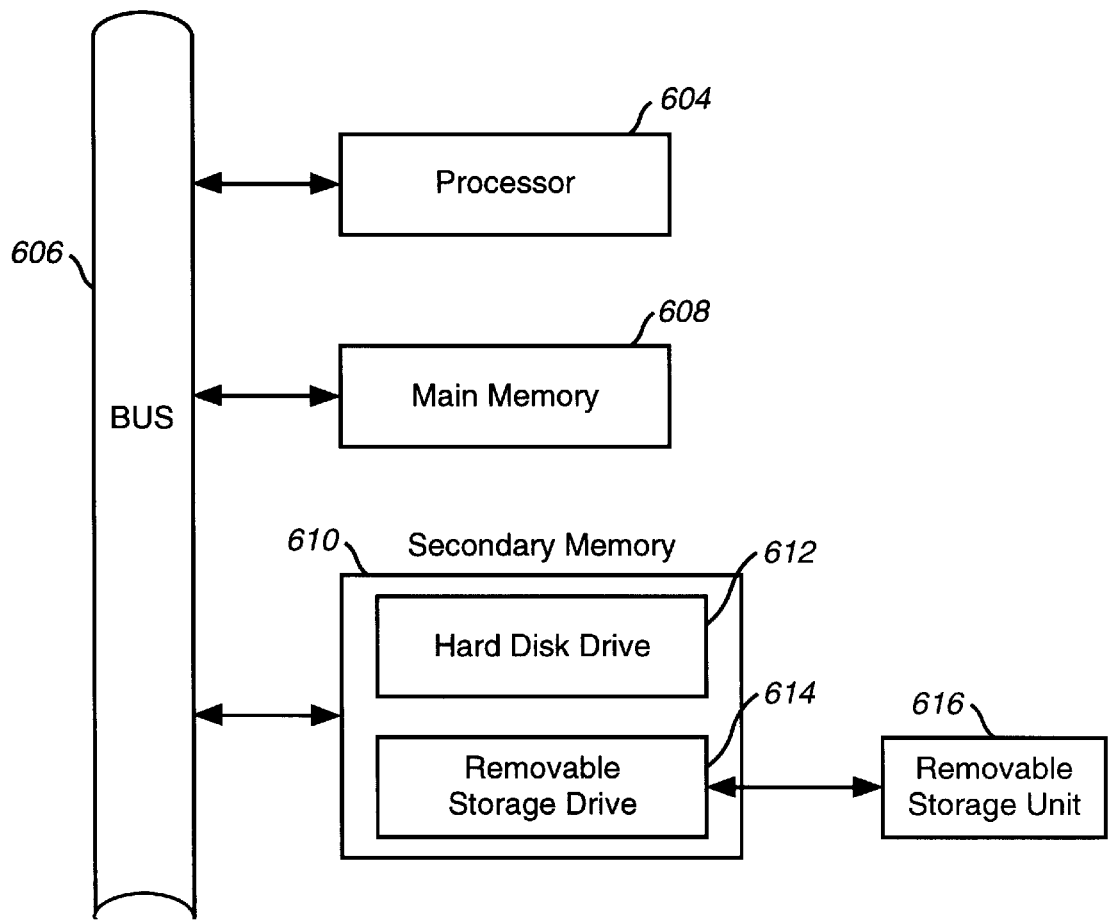
FIG. 6 illustrates a block diagram of a computer useful for implementing elements of the present invention.

In one embodiment, elements of the invention are implemented in one or more computer systems operating as discussed herein. For example, controllers 271–273, scheduler 282, server 284, reporter 286 and elements in DCC group 210 are implemented using computer systems. An exemplary computer system 602 is shown in FIG. 6. The computer system 602 includes one or more processors, such as processor 604. The processor 604 is connected to a communication bus 606.

The computer system 602 also includes a main memory 608, preferably random access memory (RAM), and a secondary memory 610. The secondary memory 610 includes, for example, a hard disk drive 612 and/or a removable storage drive 614, representing a floppy disk drive, a magnetic tape drive, a compact disk drive, etc. The removable storage drive 614 reads from and/or writes to a removable storage unit 616 in a well known manner.

Removable storage unit 616, also called a program storage device or a computer program product, represents a floppy disk, magnetic tape, compact disk, etc. As will be appreciated, the removable storage unit 616 includes a computer usable storage medium having stored therein computer software and/or data.

Computer programs (also called computer control logic) are stored in main memory and/or the secondary memory 610. Such computer programs, when executed, enable the computer system 602 to perform the features of the present invention as discussed herein. In particular, the computer programs, when executed, enable the processor 604 to perform the features of the present invention. Accordingly, such computer programs represent controllers of the computer system 602.

In another embodiment, the invention is directed to a computer program product comprising a computer readable medium having control logic (computer software) stored therein. The control logic, when executed by the processor 604, causes the processor 604 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant art(s).

While the invention has been particularly shown and described with reference to preferred embodiments thereof, it will be understood by those skilled in the relevant art that various changes in form and details may be made therein without departing from the spirit and scope of the invention.

What is claimed is:

1. A system for monitoring and configuring network elements in a telecommunications network comprising:
    a network management system coupled to the network elements via a switched network, wherein the network elements are arranged as a plurality of data communication channel groups, each group comprising a plurality of network elements, and each group comprising at least one network element that is coupled with said switch network via a craft interface port;
    a web server coupled to said network management system;
    an computer network coupled to said web server; and
    a plurality of workstations, coupled to said web server via said computer network, for user interaction with said network management system, wherein each of said workstations communicates with said web server via a web browser program.

2. The system of claim 1, wherein said network management system comprises a scheduler, a database and a controller coupled together via a second computer network.

3. The system of claim 1, wherein said user interaction includes users submitting a request to said network management system by filling out a pre-formatted web page form presented by said web server.

4. The system of claim 3, wherein said request includes an on-line request to monitor at least one of the network elements in real-time.

5. The system of claim 3, wherein said request includes a batch request to monitor at least one of the network elements.

6. The system of claim 3, wherein said request includes an on-line request to configure at least one of the network elements in real-time.

7. The system of claim 3, wherein said request includes a batch request to configure at least one of the network elements.

8. The system of claim 1, wherein said user interaction includes users navigating through a series of web pages presented by said web server to view pre-formatted reports from said network management system.

9. A method for monitoring and configuring network elements in a telecommunications network comprising:
    (1) displaying, on a web browser, a formatted user request form for accepting user requests to a network management system;
    (2) accepting, from said web browser, said user request upon submission by said user;
    (3) sending information from said user request to said network management system;
    (4) translating said information into a controller work request;
    (5) processing said controller work request;
    (6) storing results from said controller work request into a database;
    (7) formatting said results for said web browser; and
    (8) sending said results to a web server to be displayed by said web browser.

10. The method of claim 9, wherein said user request is an on-line request to monitor at least one network element in real-time.

11. The method of claim 9, wherein said user request is a batch request to monitor at least one network element.

12. The method of claim 9, wherein said user request is an on-line request to configure at least one network element in real-time.

13. The method of claim 9, wherein said user request is a batch request to configure at least one network element.

14. The method of claim 10, further comprising the step of launching a child web browser application program in a separate thread to display results from said on-line request.

15. The method of claim 12, further comprising the step of launching a child web browser application program in a separate thread to display results from said on-line request.

16. The method of claim 9, further comprising the step of sending status information to said user to provide information related to the processing of said user request.

17. A computer program product, comprising:
    a computer usable medium having computer readable program code means embodied in said medium for enabling a processor to manage program execution, said computer readable program code means comprising:
    computer readable program code means for enabling the processor to display on a web browser, a formatted user request form for accepting user requests to a network management system;

computer readable program code means for enabling the processor to accept from said web browser, said user request upon submission by said user;

computer readable program code means for enabling the processor to send information from said user request to said network management system;

computer readable program code means enabling the processor to translate said information into a controller work request;

computer readable program code means enabling the processor to process said controller work request;

computer readable program code means enabling the processor to store results from said controller work request into a database;

computer readable program code means enabling the processor to format said results for said web browser; and computer readable program code means enabling the processor to send said results to a web server to be displayed by said web browser.

18. The computer program product of claim 17, wherein said user request is an on-line request to monitor at least one network element in real-time.

19. The computer program product of claim 17, wherein said user request is a batch request to monitor at least one network element.

20. The computer program product of claim 17, wherein said user request is an on-line request to configure at least one network element in real-time.

21. The computer program product of claim 17, wherein said user request is a batch request to configure at least one network element.

22. The computer program product of claim 18, further comprising means enabling the processor to launch a child web browser application program in a separate thread to display results from said on-line request.

23. The computer program product of claim 20, further comprising means enabling the processor to launch a child web browser application program in a separate thread to display results from said on-line request.

24. The computer program product of claim method of claim 17, further comprising means enabling the processor to send status information to said user to provide information related to the processing of said user request.

* * * * *